May 2, 1933.  H. N. SHEPPARD  1,907,409
PATTERN CONTROL MECHANISM FOR KNITTING MACHINES
Filed Feb. 24, 1930   2 Sheets-Sheet 1

INVENTOR
HARRY N. SHEPPARD
by his attorneys
Howson and Howson

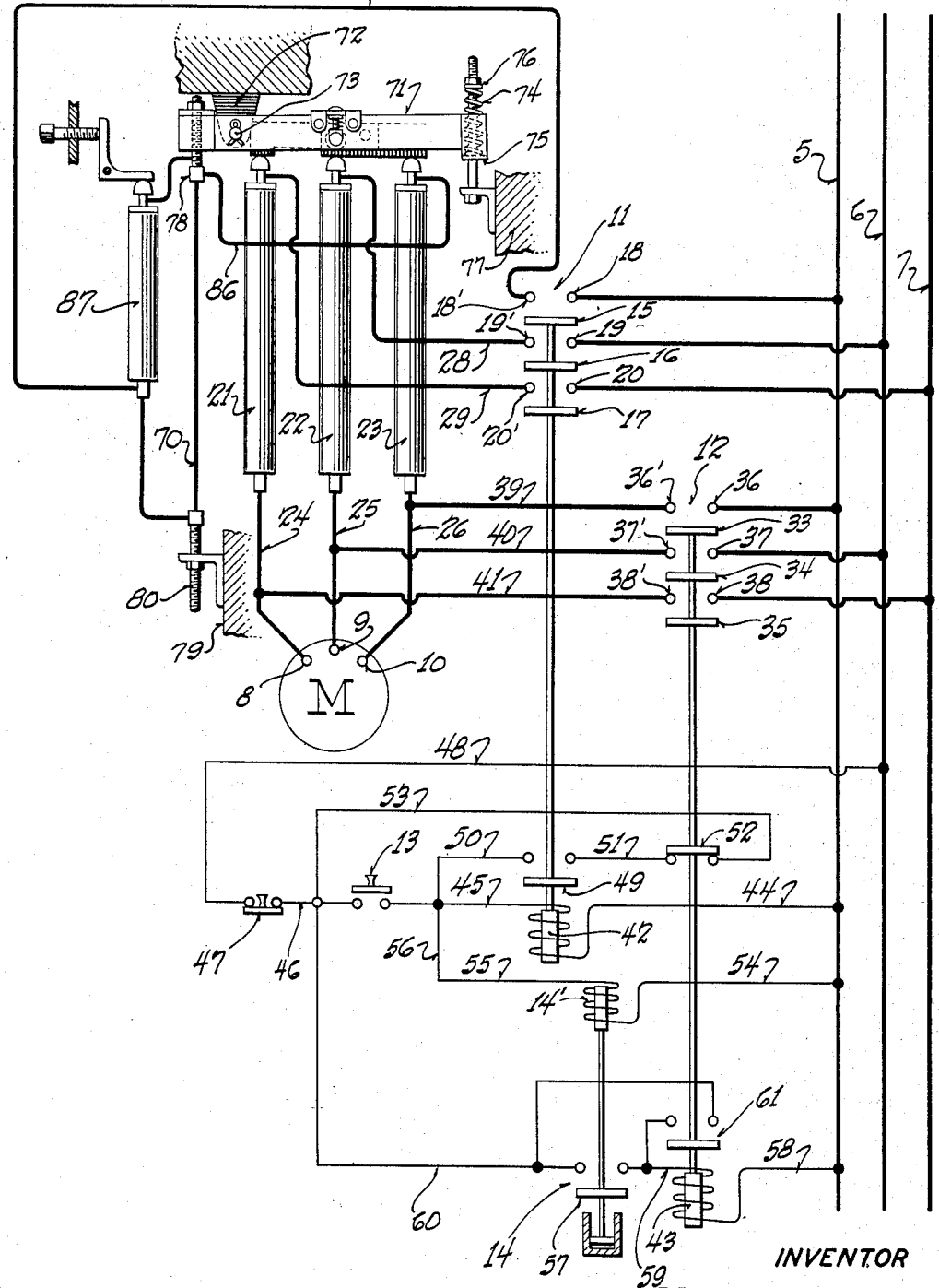

Patented May 2, 1933

1,906,409

UNITED STATES PATENT OFFICE

WALTER S. PFEIFER, OF MILWAUKEE, WISCONSIN, ASSIGNOR, BY MESNE ASSIGNMENTS, TO ALLEN-BRADLEY COMPANY, OF MILWAUKEE, WISCONSIN, A CORPORATION OF WISCONSIN

STARTING MECHANISM FOR ELECTRICAL APPARATUS

Application filed February 8, 1929. Serial No. 338,475

This invention relates to certain new and useful improvements in starting mechanisms for electrical apparatus, such as motors and the like, and is a continuation in part of a copending application filed December 7, 1927, Serial No. 238,324, as to all common subject matter.

It is an object of this invention to provide means which will automatically, gradually, decrease the resistance within a motor circuit to slowly bring the motor up to speed without overloading, as frequently occurs when the operation of the starting rheostat is manually controlled.

It is another object of this invention to provide an improved starting device for electrical motors and the like which is fully automatic, from the time the starting button is first depressed, to connect the actuating coil of the initial main switch across the line to complete the motor circuit with a maximum resistance imposed therein to a point where a second switch is actuated within a predetermined period to cut out the resistance.

It is another object of this invention to provide an improved rheostat which is independent of load conditions and gives a true time limit start.

A further object of this invention resides in the provision of means for supplying current of constant value to the thermostatic element to affect its heating and consequent expansion within a predetermined time.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

Figure 1:
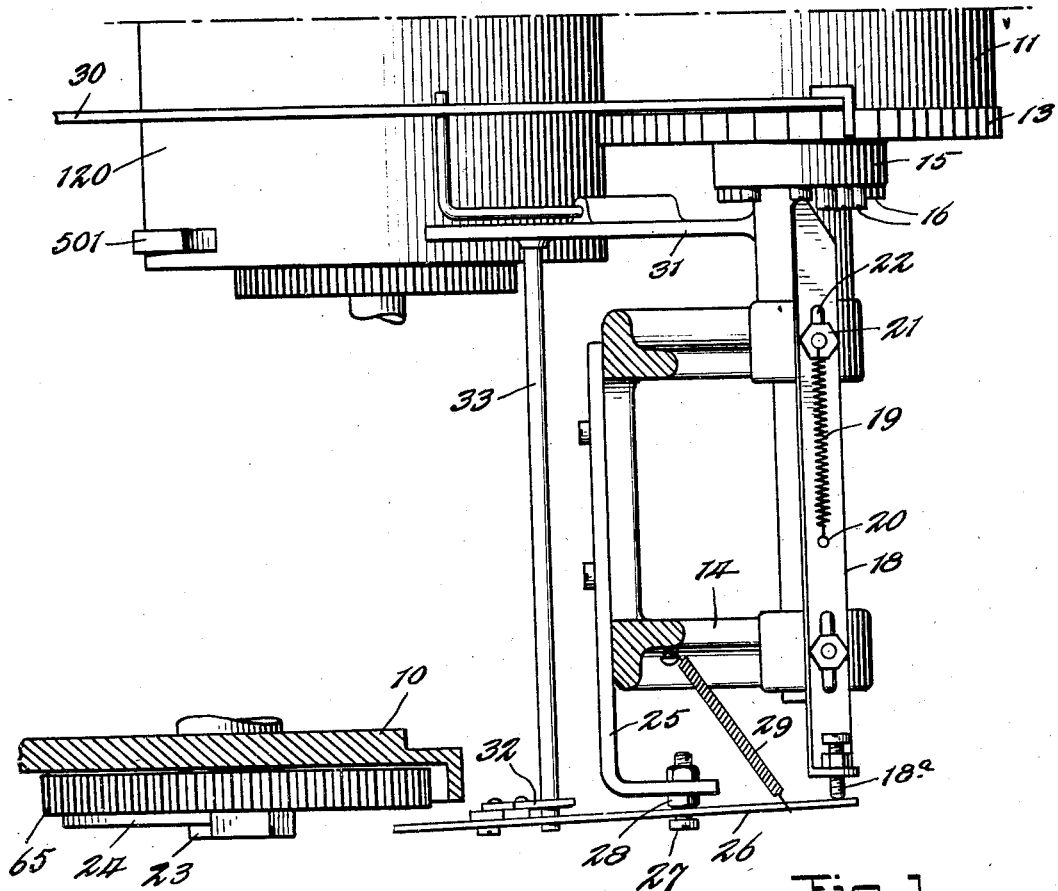
Figure 2:
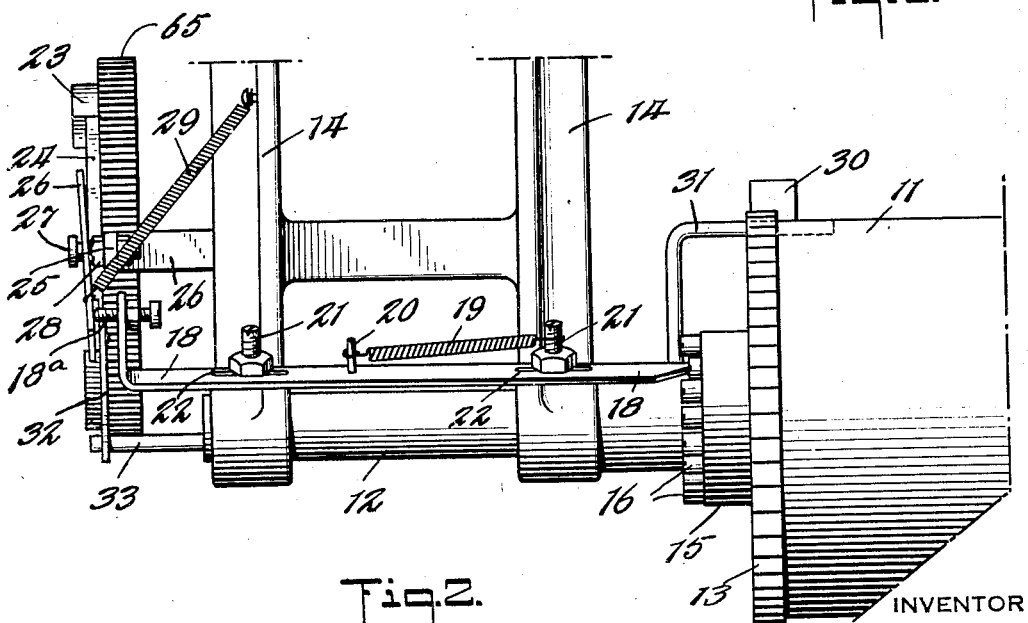

In the accompanying drawings, I have illustrated two complete examples of the physical embodiment of my invention constructed according to the best modes I have so far devised for the practical application of the principles thereof, and in which:

Figure 1 is a schematic illustration of a motor starting circuit embodying my invention; and Figure 2 is a view similar to Figure 1, and illustrating a slightly modified form of my invention.

Referring now more particularly to the accompanying drawings, the numerals 5, 6 and 7 designate main service lines which are adapted to be connected with the terminals 8, 9 and 10, respectively, of a motor or other electrical apparatus M upon the closing of either of two switches 11 and 12. The switches 11 and 12 are substantially identical in construction and are magnetically actuated to their closed position, the switch 11, upon the actuation of a starting button 13 and the switch 12, upon operation of a time relay 14 in a manner to be later described.

As the switch 11 is closed, its movable contactors 15, 16 and 17 bridge their respective stationary contacts 18—18′, 19—19′, and 20—20′ to connect the motor M with the main lines, 5, 6 and 7, through resistance units 21, 22 and 23. The resistance units 21, 22 and 23 are preferably of the compressible carbon pile type and have their lower terminals connected with the terminals 8, 9 and 10 of the motor M by conductors 24, 25 and 26.

The other or upper terminals of the resistor elements 21, 22 and 23 are connected with the contacts 18′, 19′ and 20′ of the switch 11, respectively, through conductors 27, 28 and 29. Thus it will be seen that as the switch 11 is closed current is supplied to the motor M at a reduced value due to its passage through the resistors 21, 22 and 23 to start the motor slowly and permit the same to accelerate to a predetermined point at which the time relay 14 functions to close the switch 12 which automatically opens the switch 11 and connects the motor directly across the line in a manner now about to be described.

The switch 12, as it closes, engages its movable contactors 33, 34 and 35 with their respective stationary contacts 36—36′, 37—37′, and 38—38′, to connect the motor "M" direct with the lines 5, 6 and 7 through conductors 39, 40 and 41.

The switches 11 and 12 have solenoids 42 and 43, respectively, which, when energized, close their respective switch in the usual manner. As before stated, depression of the starting button 13 closes the switch 11, this being accomplished by the energization of the solenoid 42 which takes place when its circuit is completed by the closing of the starting switch 13. The circuit for the solenoid 42 is as follows: Starting from line 5 conductor 44 leads to one terminal of the solenoid 42, from its other terminal a conductor 45 leads to one side of switch 13. From the other side of the switch 13 the circuit continues through a conductor 46, a normally closed stop switch 47 and a conductor 48 to the line 6.

After the initial energization of the solenoid 42 to close the switch 11, the circuit of the solenoid is maintained by a switch 49 which, closes with the switch 11. The circuit for the solenoid 42 then passes from line 5 through the conductor 44, through the solenoid, conductor 45, a conductor 50, across the switch 49, through a conductor 51 to one side of a switch 52, through the switch, through a conductor 53 and then through the normally closed stop switch 47 and the conductor 48 to the line 6.

Simultaneous with the energization of the solenoid 42, is the energization of the solenoid 14' of the time relay 14, whose circuit begins at line 5, passes through a conductor 54, to one side of the time relay solenoid and continues from its other side through conductors 55 and 56 and then through either switch 13 or switches 49 and 52 to conductor 48 and line 6; but due to its retarding action the relay 14 does not function immediately.

During the time the switch 11 is closed and the time relay is moving towards its closed position, the speed of the motor is accelerated from its relatively slow start by gradually reducing the resistance of the resistor elements 21, 22 and 23 in a manner to be later described, until it reaches its running speed. The time relay then closes its switch 57 which completes the circuit of the solenoid 43 of the switch 12.

The circuit by which the solenoid 43 is energized begins from line 5, passes through a conductor 58, to one terminal of the solenoid 43, and from its other terminal, the circuit continues through a conductor 59 to one side of the switch 57. From the other side of the switch 57, the circuit is continued through a conductor 60 and then through the switch 47 and a conductor 48 to line 6.

With the closing of the switch 12 the switch 52 is opened to break the continuity of the circuit of the solenoids 42 and 14' to permit the switches 11 and 57 to open, and by closing a switch 61 maintains the circuit of the solenoid 43 which remains until it is desired to stop the motor by the actuation of the stop button 47.

The gradual acceleration of the motor speed by decreasing the resistance of elements 21, 22 and 23, is accomplished in a novel manner which utilizes the expansion of a thermostatic member 70 caused by the passage of current therethrough. The pressure on the resistor elements 21, 22 and 23 is applied through an equalizing mechanism, 71, of conventional design pivoted from a suitable support 72 at a point 73 and normally urged to compress and consequently decrease the resistance of the elements by an expansile spring 74 confined between a stop 75 carried by the equalizing mechanism 71 and an adjustable stop 76 extended from a fixed support 77. The tendency of the spring 74 to compress the resistors is opposed by the thermostatic element 70 which has one end connected with the equalizing mechanism, as at 78, and the other with a fixed support 79, by means of an adjusting member 80 whereby the tension of the thermostatic element is readily adjustable.

Current is supplied to the thermal element 70 from a transformer 81, the primary of which is connected across the lines 5 and 6 when the switch 11 is closed, or in other words during the actual starting cycle. The secondary of the transformer 81 produces a comparatively high current at a relatively low voltage and has its ends connected with the ends of the thermal element 70 through conductors 84 and 85.

In this manner, the current supplied to the thermal element 70 maintains a constant value and expands the element at a predetermined rate irrespective of the usual variations in line voltage. This condition is desirable as it insures the acceleration of the motor to full speed before the actuation of the time delay relay 14 to cut the resistance out of the circuit.

In the modification illustrated in Figure 2, the thermal element 70 is in series with the resistor 21, being connected at one end with the contact 18' of the switch 11 through a conductor 85' and at its other end with the upper terminal of the resistor 21 through a conductor 86. The amount of current which passes through the thermal element and consequently its rate of expansion is readily controlled by a by-pass resistor 87 connected in parallel with the thermal element by having its lower terminal connected with the conductor 85 and its upper terminal connected with the adjacent end of the resistor element 21 through a conductor 88. Adjustment of the by-pass resistor 87 is effected by means of an adjusting screw 89 threaded in a suitable support 90 and adapted to actuate a bell crank lever 91 to apply pressure to the head 92 of the by-pass resistor.

From the foregoing description, taken in connection with the accompanying drawings, it will be readily apparent to those skilled in the art to which an invention of the character described appertains, that I provide a drum making a revolution during a plurality of even courses of the needle cylinder and that the number and arrangement of the cams on that gear can be increased, if necessary, and more lengths of screws employed to make the selection. It will further be obvious that by these means the periods of dwell on the cams on the drum 11 can be made different from each other and changed as desired to produce any desired length of pattern selections.

What I claim is:

1. A knitting machine having a revolving pattern drum and a rack wheel and pawl to drive the drum, in combination with an idler for said pawl, a gear wheel, a plurality of cam paths thereon and lever means controlled by the rack wheel selecting different cam paths and translating the cam selections into idling movements of the pawl.

2. A circular knitting machine having revolving pattern means consisting of a pattern drum and a rack wheel revolving therewith and a pawl to drive said drum and rack wheel, in combination with revolving means adapted to have a plurality of different recurrent idling effects on the pawl and means on the pattern means selecting from the idling effects of the revolving means to increase or decrease the number of movements of the pawl required to revolve the rack wheel once.

3. A circular knitting machine having revolving pattern means, a rack wheel and pawl therefor, in combination with means controlled by the rack wheel having selecting movements laterally with respect thereto, adapted to vary the effectiveness of movement of the pawl.

4. A knitting machine having a revolving pattern drum and a rack wheel and pawl to drive said drum, in combination with an idler for said pawl, and means controlled by the rack wheel having selecting movements laterally with respect thereto indicating different variations in the racking of the wheel, and adapted to vary the idler in accordance with said variations.

5. A knitting machine having a revolving pattern drum and a rack wheel and a pawl to drive the drum, in combination with indicating means on the rack wheel and means cooperating therewith and movable laterally with respect thereto adapted to have a recurrent effect on the pawl or to increase or decrease selectively the number of movements of the drum necessary to turn the rack wheel once.

6. A circular knitting machine having a revolving pattern drum and a rack wheel and pawl to drive the pattern drum, in combination with an idler for said pawl, means acting on the idler determining the individual operations thereof and other means selectively determining the sequence of operations of said operating means, said rack wheel and last two mentioned means causing idling of the pawl and permitting return thereof to operative relation with said wheel.

7. A circular knitting machine having revolving pattern means, a rack wheel and pawl therefor, in combination with means for causing different operations of the pawl, indicating means associated with the rack wheel, and means cooperating therewith and movable laterally with respect thereto for selectively determining the sequence of operations of said operating means.

8. A circular knitting machine having revolving pattern means, a rack wheel and a pawl therefor, means for causing different operations of said pawl, an element mounted for sliding movement, and indicating means actuated by said rack wheel and cooperating with said slidable element to selectively determine the sequence of operations of said operating means.

9. A circular knitting machine having revolving pattern means, a rack wheel and pawl therefor, in combination with indicating means associated with said rack wheel, and means cooperating with said indicating means and controlled thereby for varying the effectiveness of movement of the pawl, said indicating means being adjustable to select a different effect.

In testimony whereof I have signed my name to this specification.

HARRY N. SHEPPARD.